(12) United States Patent
Marinelli et al.

(10) Patent No.: US 10,577,943 B2
(45) Date of Patent: Mar. 3, 2020

(54) TURBINE ENGINE AIRFOIL INSERT

(71) Applicant: General Electric Company, Schenectady, NY (US)

(72) Inventors: Andrea Terese Marinelli, Cambridge, MA (US); Robert Francis Manning, Newburyport, MA (US); Bhanu Mahasamudram Reddy, Boxford, MA (US)

(73) Assignee: General Electric Company, Schenectady, NY (US)

( * ) Notice: Subject to any disclaimer, the term of this patent is extended or adjusted under 35 U.S.C. 154(b) by 349 days.

(21) Appl. No.: 15/592,300

(22) Filed: May 11, 2017

(65) Prior Publication Data

US 2018/0328188 A1 Nov. 15, 2018

(51) Int. Cl.
*F01D 5/18* (2006.01)

(52) U.S. Cl.
CPC ............. *F01D 5/186* (2013.01); *F01D 5/188* (2013.01); *F05D 2250/21* (2013.01); *F05D 2250/23* (2013.01); *F05D 2250/232* (2013.01); *F05D 2260/201* (2013.01); *F05D 2260/202* (2013.01)

(58) Field of Classification Search
CPC . F01D 5/26; F01D 5/186; F01D 5/187; F01D 5/188; F01D 5/189; F05D 2250/21; F05D 2250/232; F05D 2250/23; F05D 2260/201; F05D 2260/202
See application file for complete search history.

(56) References Cited

U.S. PATENT DOCUMENTS

| | | | | |
|---|---|---|---|---|
| 3,540,810 A | * | 11/1970 | Kercher | F01D 5/189 415/115 |
| 3,715,170 A | | 2/1973 | Savage et al. | |
| 3,966,357 A | * | 6/1976 | Corsmeier | F01D 5/189 416/97 R |
| 4,413,949 A | | 11/1983 | Scott | |
| 5,516,260 A | | 5/1996 | Damlis et al. | |
| 6,280,140 B1 | * | 8/2001 | Soechting | F01D 5/184 416/97 R |
| 6,435,813 B1 | * | 8/2002 | Rieck, Jr. | F01D 5/188 415/115 |
| 6,468,031 B1 | | 10/2002 | Yu et al. | |
| 6,874,988 B2 | * | 4/2005 | Tiemann | F01D 5/189 415/115 |
| 9,581,028 B1 | * | 2/2017 | Jones | F01D 5/18 |
| 9,988,913 B2 | * | 6/2018 | Spangler | F01D 9/041 |
| 2007/0231150 A1 | | 10/2007 | Dervsaux et al. | |
| 2016/0222796 A1 | | 8/2016 | Spangler et al. | |

* cited by examiner

*Primary Examiner* — Brian P Wolcott
(74) *Attorney, Agent, or Firm* — McGarry Bair PC

(57) ABSTRACT

An apparatus and method for improving the heat transfer coefficient for an engine component for a turbine engine such as an airfoil. The airfoil can include an outer wall defining an interior. A cooling passage can be formed in the interior defining a flow direction. An insert can be provided in the cooling passage to occupy a volume of the cooling passage to maintain a threshold Mach number for an airflow passing through the cooling passage to improve the heat transfer coefficient.

22 Claims, 6 Drawing Sheets

TURBINE ENGINE AIRFOIL INSERT

STATEMENT REGARDING FEDERALLY SPONSORED RESEARCH OR DEVELOPMENT

This invention was made with government support under Contract No. W58RGZ16C0047 awarded by the United States Government. The United States Government has certain rights in this invention.

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade. Heightened operational and environmental requirements for turbine engines necessitate improved cooling while balancing efficiency needs.

BRIEF DESCRIPTION OF THE INVENTION

In one aspect, the present disclosure relates to an airfoil for a turbine engine including an outer wall bounding an interior and defining a pressure side and a suction side extending axially between a leading edge and a trailing edge to define a chord-wise direction and extending radially between a root and a tip to define a span-wise direction. A cooling passage is located in the interior and has an inner surface and defines a flow direction along the cooling passage. An insert is provided in the cooling passage and has an imperforate sidewall terminating at an end with the sidewall spaced from the inner surface of the cooling passage by a gap. The insert has a non-constant cross-sectional area. The gap is non-constant along the sidewall and increases extending along the flow direction.

In another aspect, the present disclosure relates to a component for a turbine engine including an outer wall defining an interior and a cooling passage formed within the interior having an inner surface and defining a flow direction through the cooling passage. An insert having a variable cross-sectional area is provided in the interior having an imperforate sidewall and is spaced from the inner surface of the cooling passage by a gap that varies in the flow direction.

In yet another aspect, the present disclosure relates to a method of increasing a heat transfer coefficient along an outer wall of an airfoil for a turbine engine includes: occupying a volume of a cooling passage within the component with an insert having a decreasing cross-sectional area to define a gap having an increasing cross-sectional area between the insert and the cooling passage.

DETAILED DESCRIPTION OF THE INVENTION

Figure 1:
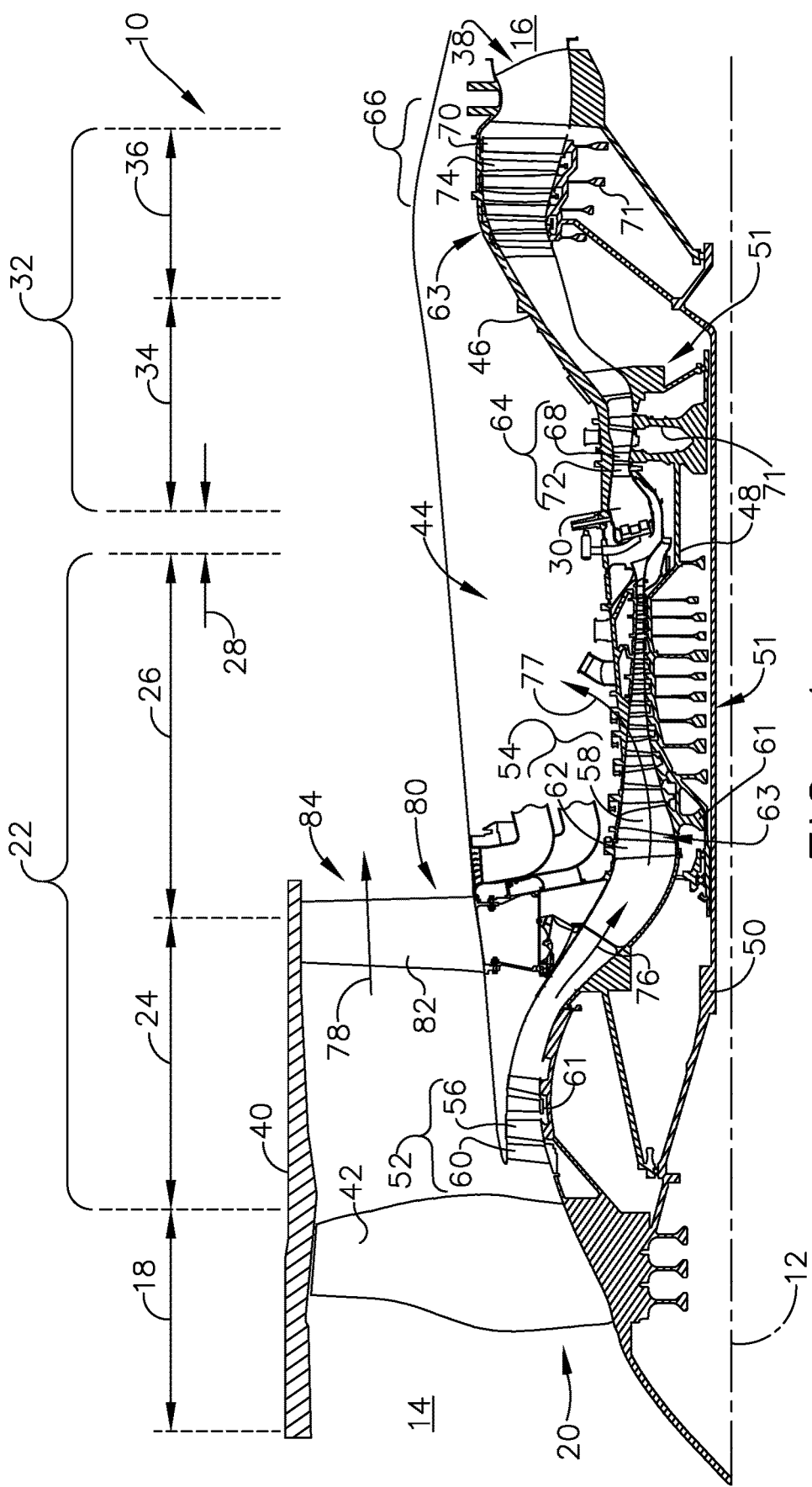
FIG. 1 is a schematic cross-sectional diagram of a gas turbine engine for an aircraft in accordance with aspects described herein.

Aspects of the disclosure described herein are directed to an insert for an airfoil for a turbine engine. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates a gas turbine engine 10 for an aircraft including a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
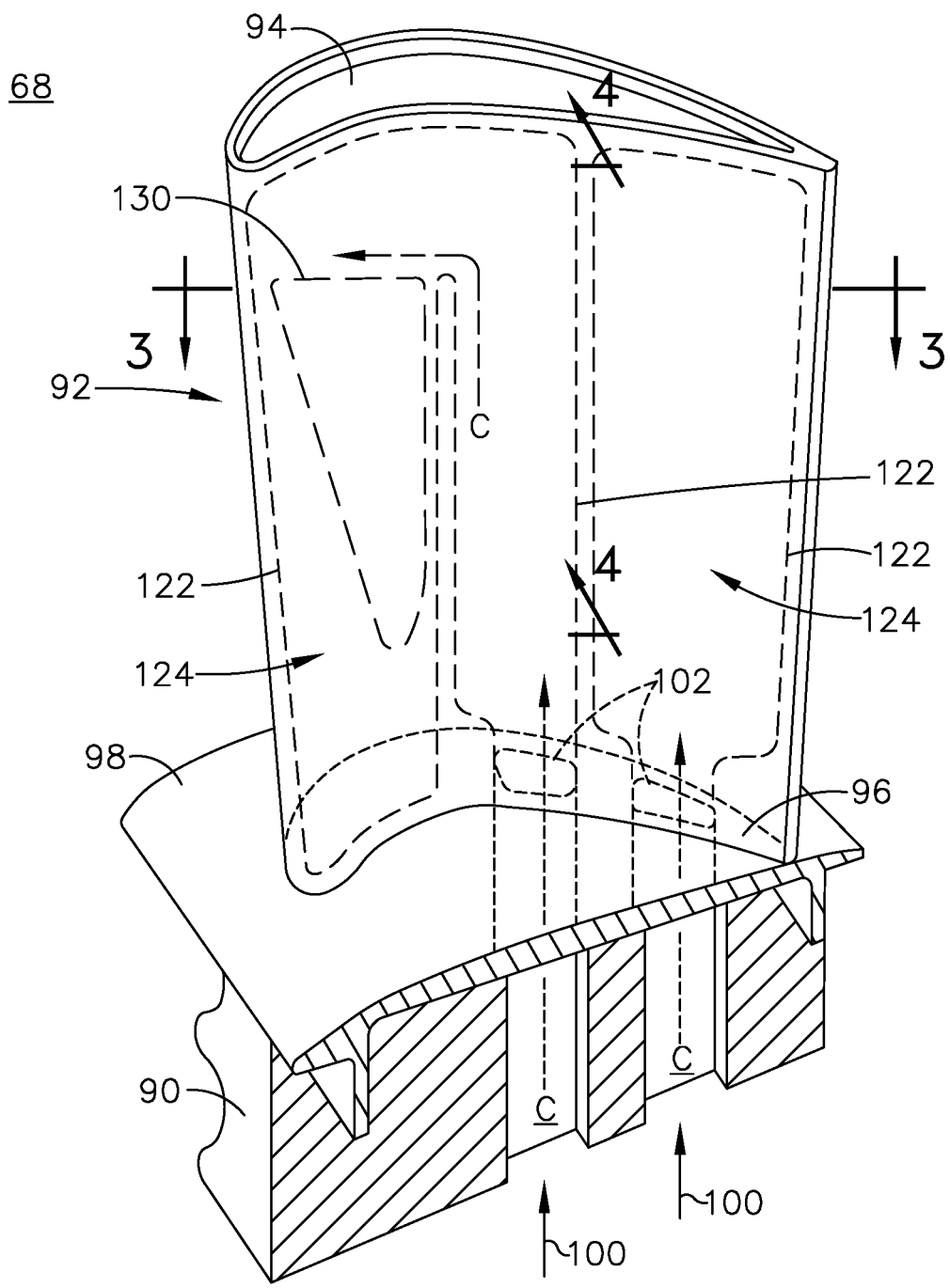
FIG. 2 is perspective view of an airfoil provided in the gas turbine engine of FIG. 1

FIG. 2 is illustrates an engine component in the form of one of the turbine blades 68 including a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain a turbine engine mainstream airflow driven by the blade 68. The dovetail 90 can be configured to mount to a turbine rotor disk on the engine 10.

The dovetail 90 further includes at least one inlet passage 100, with the exemplary dovetail 90 shown as a having three inlet passages 100. The inlet passages 100 extend through the dovetail 90 to provide internal fluid communication with the airfoil 92 at a passage outlet 102. It should be appreciated that the dovetail 90 is shown in cross-section, such that the inlet passages 100 are enclosed within the body of the dovetail 90. A flow of cooling fluid C can be provided to the airfoil 92 through the inlet passage 100 exhausting at the outlets 102.

One or more cooling passages 122 can be provided within the airfoil 92 to form a cooling circuit 124 for providing the cooling fluid C throughout the airfoil 92. The cooling passages 122 are exemplary as illustrated, and any organization of cooling passages is contemplated. An insert 130 can be provided in one of the cooling passages 122.

While illustrated and discussed in relation to a rotating blade, it should be appreciated that the insert 130 and other aspects described herein can have equal applicability to a stationary vane or nozzle, as well as any other component where the use of such an insert may be desirable.

Figure 3:
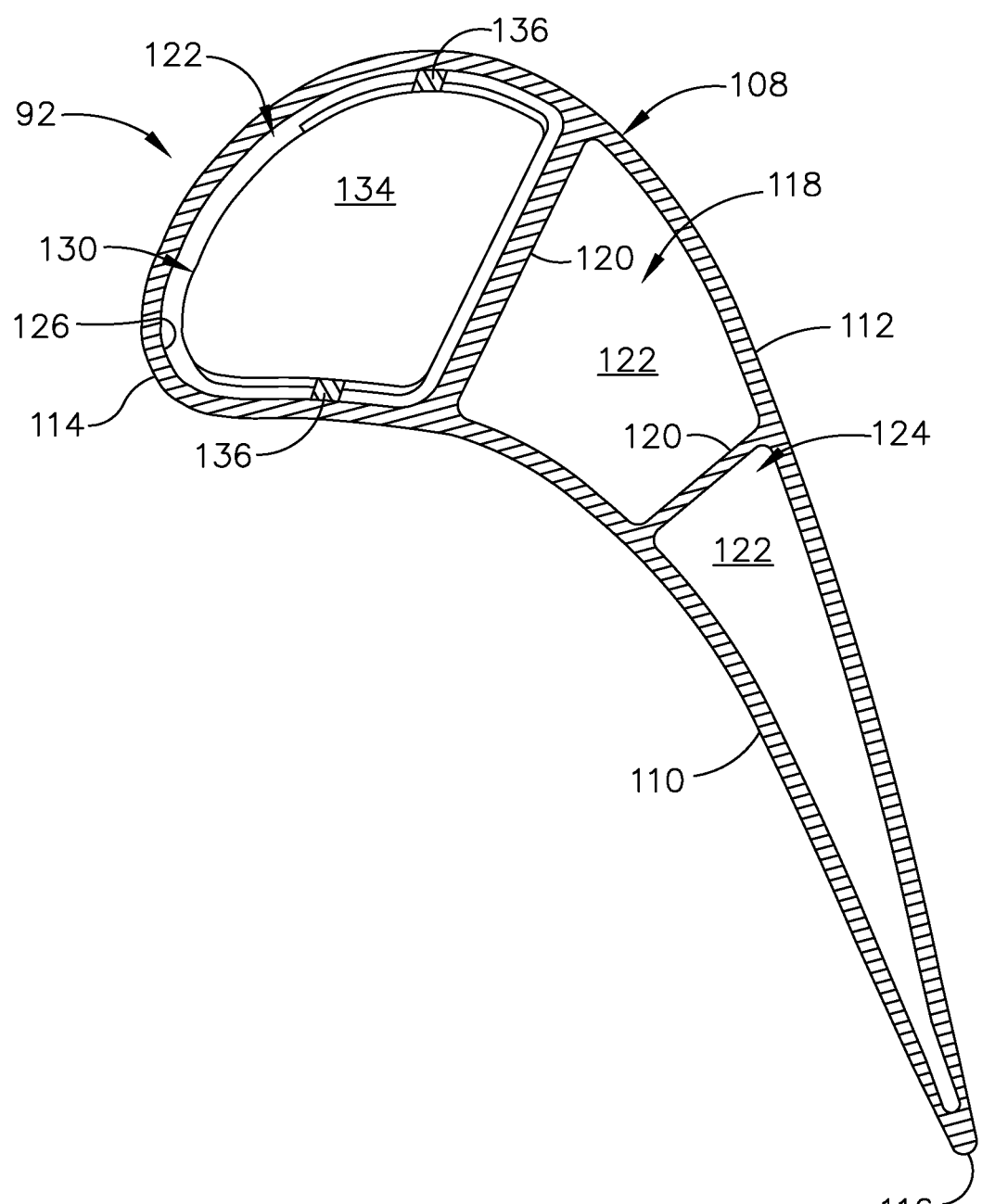
FIG. 3 is cross-sectional view of the airfoil of FIG. 2 taken across section 3-3 of FIG. 2 including an insert.

Referring now to FIG. 3, the airfoil 92 includes an outer wall 108 with a concave-shaped pressure sidewall 110 and a convex-shaped suction sidewall 112 joined together to define the airfoil shape for the airfoil 92, an includes a leading edge 114 and a trailing edge 116 defining a chord-wise direction therebetween. During operation, the airfoil 92 rotates in a direction such that the pressure sidewall 110 follows the suction sidewall 112. Thus, as shown in FIG. 3, the airfoil 92 would rotate upward toward the top of the page.

An interior 118 is defined by the outer wall 108. One or more interior walls shown as ribs 120 can divide the interior 118 into the multiple cooling passages 122. An inner surface 126 can define the cooling passages and at least partially define the interior 118. While shown as having the outer wall 108 at least partially defining the inner surface 126, it should be appreciated that the inner surface 126 need not be formed on the outer wall 108. The cooling passages 122 can fluidly couple to one or more other cooling passages 122 or features formed within the airfoil 92 to define the cooling circuits 124. It should be appreciated that the interior structure of the airfoil 92 is exemplary as illustrated and can be organized in a myriad of different ways with one or more additional features such as single channels extending in the span-wise direction, or can be complex cooling circuits, having multiple features such as passages, channels, inlets, outlets, ribs, pin banks, circuits, sub-circuits, film holes, plenums, mesh, turbulators, or otherwise in non-limiting examples.

The insert 130 can be provided in the interior 118, positioned within one cooling passage 122. Two tabs 136 can couple the insert 130 to the outer wall 108 or the inner surface 126 of the cooling passage 122 to mount the insert 130 within the cooling passage 122. While two tabs 136 are shown, any number of tabs 136 can be used to mount the insert 130, as well as any other suitable mounting method.

Figure 4:
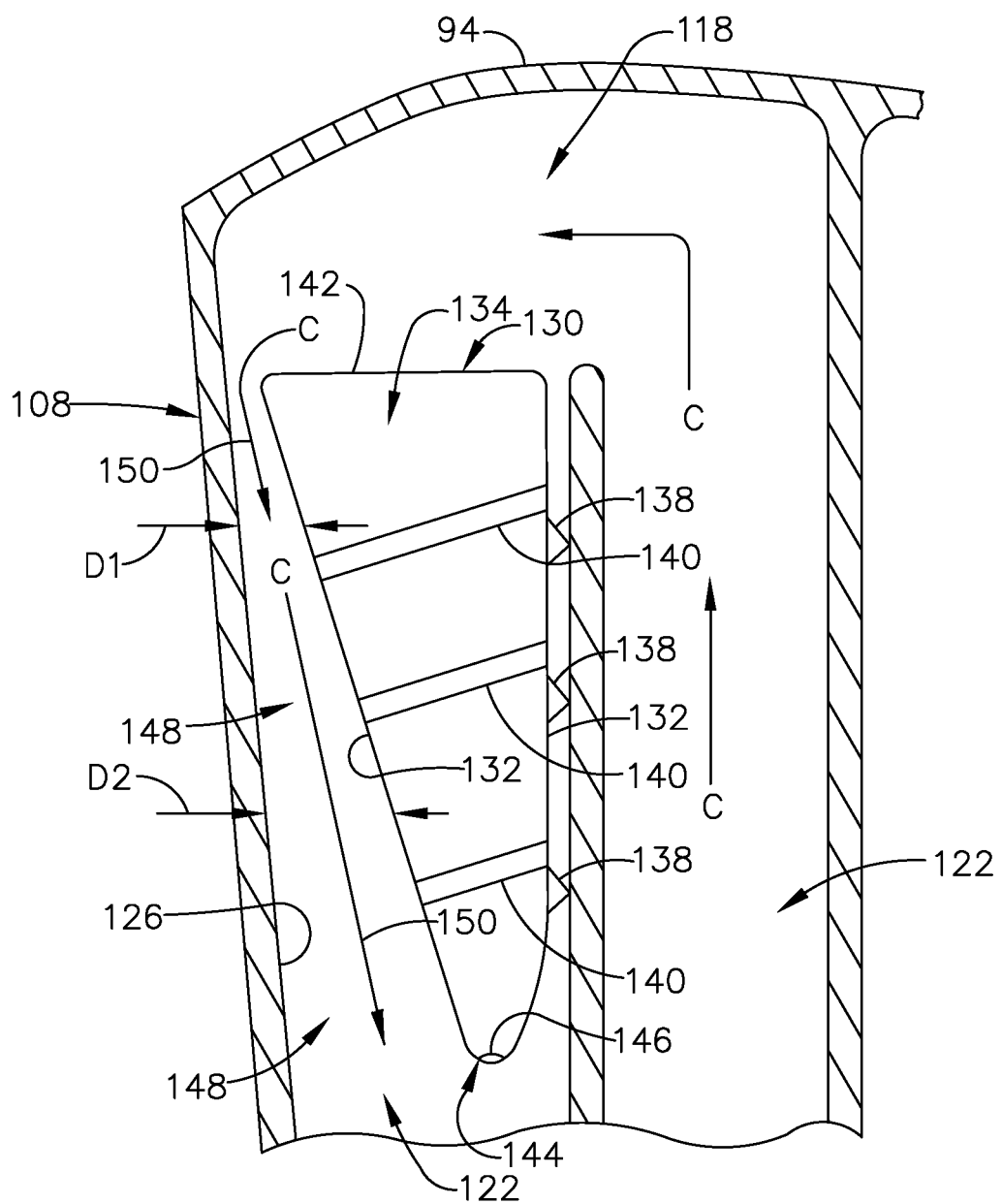
FIG. 4 is section view of a portion of the airfoil of FIG. 3 taken along section 4-4, illustrating the insert positioned within the airfoil.

Referring now to FIG. 4, an imperforate sidewall 132 for the insert 130 defines an insert interior 134. While illustrated as a single, continuous sidewall 132, it is contemplated that the sidewall 132 can be separated into multiple adjoined walls to form the sidewall 132 for the insert 130. The insert interior 134 has a smaller cross-sectional area than the cooling passage 122 within which the insert 130 is provided. The insert 130 can include an opening 142 fluidly coupling the interior 134 of the insert 130 to the interior 118 of the airfoil 92 between the outer wall 108 and the sidewall 132 of the insert 130. The insert 130 can terminate at an end 144 opposite of the opening 142. An aperture 146 can be provided in the end 144. The apertures 146 provide for balancing pressure differentials between the interior 134 of the insert 130 and the interior 118 of the airfoil 92, which can increase or decrease locally and negatively impact airflows passing within the airfoil 92.

One or more vibration attenuators 138 can be provided on the sidewall 132 abutting the rib 120. The vibration attenuators 138, in non-limiting examples, can be made of an elastomeric or polymeric material in order to absorb vibration between the insert 130 and the outer wall 108 during operation.

One or more flow enhancers, illustrated as two turbulators 140, can be provided on the sidewall 132 of the insert 130 and spaced from the outer wall 108 of the airfoil 92. While shown as turbulators 140, any suitable flow enhancer can be utilized to influence a flow between the sidewall 132 and the outer wall 108. Other similar flow enhancers, in non-limiting examples, can include bumps, chevrons, protrusions, or protuberances, as well as negative features formed into the sidewall 132, such as dimples, grooves, channels, or divots. Similarly, the sidewall 132 can be contoured to defined flow enhancing shapes, without the requirement of positive material to define the flow enhancer.

The insert 130 can define a cross-sectional area. The cross-sectional area, in one-non-limiting example, can be defined in the axial direction. Similarly, the inner surface 126 for the cooling passage 122 can define a cross-sectional area, which can also be defined in the axial direction. The cross-sectional area of the insert 130 can decrease from the opening 142 in a local flow direction 150 defined by the flow of cooling fluid C passing through the airfoil 92 in a substantially span-wise direction. Similarly, it is illustrated that that cross-sectional area of the cooling passage 122 can decrease in the same direction, while it should be appreciated that the cross-sectional area of the cooling passage 122 can remain constant or increase in the same direction. It is further contemplated that the cross-sectional area of the cooling passage 122 can be variable, having a combination of increasing, decreasing, or constant cross-sectional areas, as is desirable for the particular airfoil design. The insert 130 is formed such that the cross-sectional area of the insert 130 is non-conforming to the outer wall 108 of the airfoil 92 or the cross-sectional area defined by the cooling passage 122.

A gap 148 can be defined between the inner surface 126 and the sidewall 132 of the insert 130 by the differing cross-sectional areas of the insert 130 and the cooling passage 122. The gap 148 can include a distance, taken at distances D1, D2, between the inner surface 126 and the sidewall 132. The insert 130 can include a decreasing cross-sectional area in the flow direction such that the distance D1, D2 increases in the flow direction 150, where the second distance D2 is greater than the first distance D1. While the cross-sectional area of the cooling passage 122 is illustrated as constant, it should be appreciated that it can also decrease in the flow direction 150, and that the rate of decrease for the insert 130 should be greater than that of the cooling passage 122, such that the first distance D1 is greater than the second distance D2. Stated another way, the gap 148 can increase the flow direction 150. Such a increase in cross-sectional area for the gap 148 can be constant, non-constant, variable, or can be discrete, or any combination thereof in non-limiting examples.

While a portion of the flow of fluid C can pass into the interior 134 of the insert 130, a majority of the flow of fluid C can pass into the gap 148. The aperture 146 should be sized to permit only a small amount of the flow of fluid C to pass through the insert 130, such that the insert interior 134 does not over-pressurize, overheat, stagnate, or cause a backflow.

The flow of fluid C passing through the gap 148 can have an increased local flow speed. The insert 130 effectively reduces the cross-sectional area of the cooling passage 122, increasing the speed passing exterior of the insert 130. As such, the gap 148 distance can be proportional to local speed of the flow of cooling fluid C. As the gap 148 increases, with a decreasing cross-sectional area of the insert 130, the speed of the flow of cooling fluid C can decrease. Therefore, the cross-sectional area of the insert 130 can be tailored to determine a speed for the flow of fluid C passing through the gap 148. For example, the insert 130 can be sized to adapt the gap 148 in order to locally tailor the speed of the flow of fluid C relative to the local portion of the airfoil 92. Such a tailored speed, for example, can be maintained above a threshold Mach number when passing along the insert 130. In one non-limiting example, the threshold Mach number can be between 0.04 and 0.45

It should be appreciated that the gap 148 always includes a distance or cross-sectional area that is lesser than that of the cooling passage 122, providing for an increased flow speed as compared to a cooling passage 122 without the insert. The increased local flow speed generated by the gap 148 created by the insert 130 improves local heat transfer coefficients along the inner surface 126. The improved local heat transfer coefficients provides for improved cooling of the airfoil 92, as well as the ability to locally tailor the heat transfer coefficients to the needs of the particular airfoil 92 based upon the design of the insert to define the local gap 148. Furthermore, the turbulators 140 or other flow enhancers can be used to further improve or tailor the local heat transfer coefficients. Turbulating the flow of cooling fluid C can cause non-laminar flow patterns, which can be tailored to increase the local heat transfer coefficient.

While the flow direction is shown in a radially inward direction in the exemplary airfoil of FIG. 4, it should be appreciated that the particular organization of the airfoil can define a flow direction in any direction, such as in a radially outer direction or in a span-wise direction opposite from that as shown, and that the insert can define a gap 148 that decreases in the radially outer direction.

In an alternative example, it is contemplated that the insert 130 can include an increasing cross-sectional area in the flow direction along a portion of the insert 130, defining a decreasing gap 148 in combination with the increasing gap 148. Therefore, it should be understood that the insert can have a non-constant cross-sectional area defining a gap with non-constant cross-sectional area that can have any orientation relative to the flow of fluid adjacent the insert. Furthermore, the insert can be provided at any orientation, being radial, axial, circumferential, or a combination thereof in non-limiting examples, defining a flow path travelling in any such direction.

The insert 130 as described herein provides for improved heat transfer coefficients along portions of the airfoil adjacent the cooling passages 122. Such areas receiving the improved heat transfer coefficients can include the outer wall 108, the ribs 120, or any other adjacent structure. The improved heat transfer coefficients are resultant of the reduced flow area defined by the insert 130 generating an increased airflow velocity. Furthermore, the turbulators or similar flow enhancers can further improve or locally tailor the heat transfer coefficients by affecting the flow passing through the cavity. The insert 130 provides for improved heat transfer coefficients, flow velocities with minimal weight addition. Additionally, maintenance of the insert only requires removal and replacement.

Figure 5:
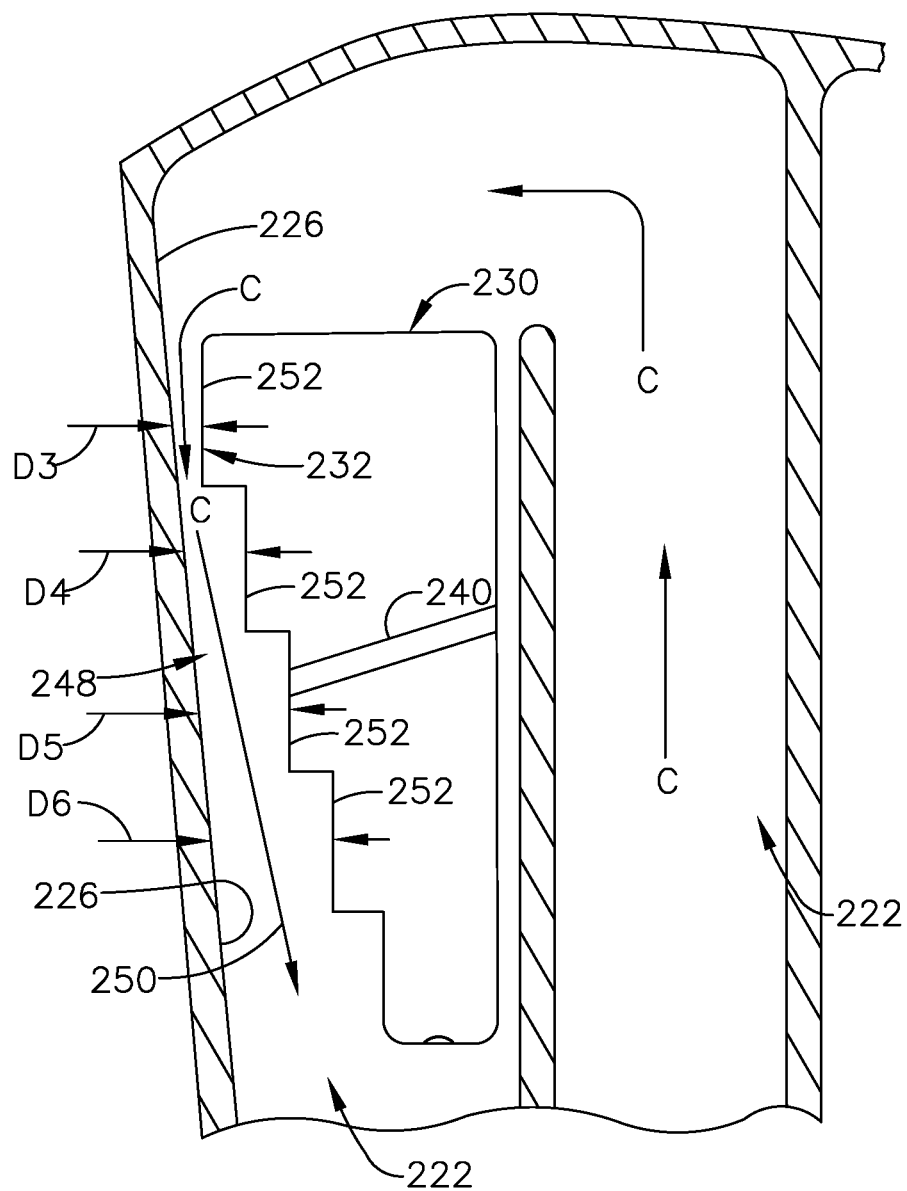
FIG. 5 is a section view of an alternative insert having discrete geometry.

Referring now to FIG. 5, an alternative exemplary insert 230 is illustrated within another exemplary airfoil 192. The airfoil 192 of FIG. 5 can be substantially similar to that of FIG. 4. As such, similar numerals will be used to described similar elements increased by a value of one hundred, and the discussion will be limited to differences between the two.

The insert 230 includes a sidewall 232 at least partially defining a stepped profile. The insert 230 includes a non-constant cross-sectional area to define a gap 248 that increases in a flow direction 250. The stepped profile of the sidewall 232 provides for a non-constant cross-sectional area the discretely varies in a step-wise manner defining a set of steps 252. The steps 252 can define discrete gap distances D3, D4, D5, D6, which can be used to locally tailor flow speeds through the gap 248. A smaller gap distance D3 provides for higher flow speeds, which results in higher local heat transfer coefficients. The tailored flow speeds can be used to tailor the local heat transfer coefficients along the inner surface 226 to the particular needs of the airfoil 192. Additionally, turbulators 240 can be utilized to turbulate the flow of cooling fluid C through the gap 248 to further enhance to local heat transfer coefficients.

Figure 6:
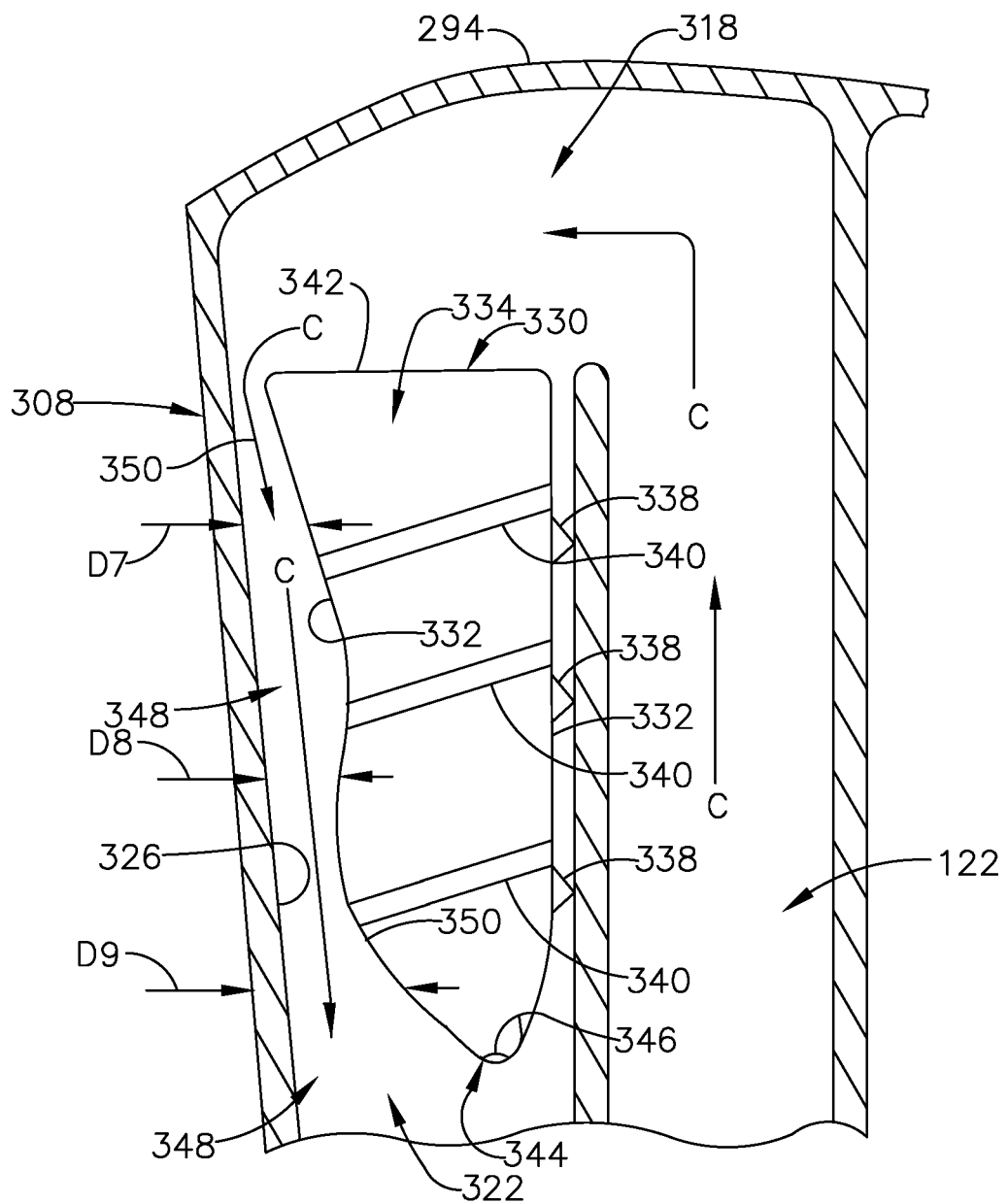
FIG. 6 is a section view of another alternative insert having a variable cross-sectional area.

Referring now to FIG. 6, an alternative insert 330 and can be substantially similar to the insert 130 of FIG. 4. As such, similar numerals will be used to describe similar elements, increased by a value of two hundred and discussion will be limited to differences between the two.

The insert 330 includes an interior 334 having a variable cross-sectional area. The cross-sectional area can decrease, then increase, and then decrease in a direction from an opening 142 to the end 344. As such, the cross-sectional area of the insert 330 can discretely decrease, then increase, or can discretely increase, then decrease, or both.

The variable cross-sectional area of the insert 330 can define a gap 348 that has a variable spacing form the outer wall 308. The gap 348 can increase at D7, decrease at D8, and increase at D9. Similarly, the variable gap 348 can discretely increase then decrease, such as D7 and D8, or can discretely decrease then increase, such as at D8 and D9.

The variable cross-sectional area for the insert 330 can include local portions that increase or decrease that define complementary portions of the gap 348 that can decrease or increase, respectively. Similarly, a flow of cooling fluid C passing through the gap 348 can have a discretely increasing or decreasing speed, to locally tailor the flow of cooling fluid C to maintain a speed above a threshold Mach number. This can be done locally, such that the speed of the flow of cooling fluid C is maintained above the threshold Mach number along portions of the insert 330, while other portions need not maintain the flow at such speeds. As such, the insert 330 can be particularly tailored to meet the local cooling needs of the airfoil 292, while maintaining sufficient pressure within the particular component.

While the airfoil has been generally described in relation to a cooled blade, such as for the high-pressure turbine section, the insert can have equal applicability in a cooled cavity for any engine component, such as a vane, a shroud or a combustor liner using impingement type jackets in non-limiting examples. Such combustor liners can be include impingement-type jackets that are turbulated but do not include impingement holes.

A method of increasing a heat transfer coefficient along an outer wall of a component for a turbine engine can include occupying a volume of a cooling passage within the component with an insert having a decreasing cross-sectional area to define a gap having an increasing cross-sectional area between the insert and the cooling passage. The insert can be the insert 130, 230 as described herein, for example, and can be provided in the cooling passage, such as the cooling passage 122, 222 of FIGS. 3-5, by mounting the insert at the tabs 136 in order to position the insert to occupy a volume of the cooling passage. The method can further include passing an airflow through the gap. The insert can be used to effectively decrease the volume or cross-sectional area of the cooling passage to increase the local flow speed of the airflow passing through the cooling passage. The increased flow speed of the airflow provides for increasing local heat transfer coefficients to improve cooling effectiveness within the component. The geometry of the insert can be adapted based upon the geometry of the cooling passage to provide such a desired flow speed. Furthermore, the increased flow speed can be maintained above the threshold Mach number to maintain appropriate pressure and to provide a desired heat transfer coefficient along the inner surface of the flow passage. The threshold Mach number can be between 0.04 and 0.45 in one non-limiting example.

The method can further include turbulating the airflow with turbulator provided on the insert, such as the turbulators 140 as described herein. Alternatively, any flow enhancing structure can be used to turbulate the flow. Furthermore, the method can include damping vibrations of the insert with at least one vibration attenuator on the insert, such as the vibration attenuators 138 of FIG. 4.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall bounding an interior and defining a pressure side and a suction side extending axially between a leading edge and a trailing edge to define a chord-wise direction and extending radially between a root and a tip to define a span-wise direction;
a cooling passage located in the interior and having an inner surface and defining a flow direction along the cooling passage; and
an insert provided in the cooling passage and having an imperforate sidewall terminating at an end with the imperforate sidewall spaced from the inner surface of the cooling passage by a gap; and
wherein the insert has a non-constant cross-sectional area, the gap is non-constant along the imperforate sidewall, and at least a portion of the gap increases step-wise extending along the flow direction.

2. The airfoil of claim 1 wherein the flow direction extends in a radially inward direction from the tip toward the root.

3. The airfoil of claim 1 wherein the outer wall has an inner surface defining at least a portion of the inner surface of the cooling passage.

4. The airfoil of claim 3 wherein the insert is non-conforming to the inner surface of the outer wall.

5. The airfoil of claim 1 wherein the cross-sectional area of the insert decreases along the flow direction.

6. The airfoil of claim 5 wherein the cross-sectional area of the insert decreases continuously.

7. The airfoil of claim 5 wherein the cross-sectional area of the insert decreases discretely.

8. The airfoil of claim 1 wherein the insert includes flow enhancers on the insert extending into the gap.

9. The airfoil of claim 1 further comprising a vibration attenuator coupled to one of the insert or the inner surface of the cooling passage.

10. The airfoil of claim 1 wherein the insert maintains an airflow speed passing through the gap above a threshold Mach number.

11. The airfoil of claim 10 wherein the threshold Mach number between 0.04 and 0.45.

12. An airfoil for a turbine engine, the airfoil comprising:
an outer wall bounding an interior and defining a pressure side and a suction side extending axially between a leading edge and a trailing edge to define a chord-wise direction and extending radially between a root and a tip to define a span-wise direction;
a cooling passage located in the interior and having an inner surface and defining a flow direction along the cooling passage; and
an insert provided in the cooling passage and having an imperforate sidewall terminating at an end with the imperforate sidewall spaced from the inner surface of the cooling passage by a gap; and
wherein the insert has a non-constant cross-sectional area, the gap is non-constant along the imperforate sidewall, and at least a portion of the gap increases continuously extending along the flow direction.

13. The airfoil of claim 12 wherein the flow direction extends in a radially inward direction from the tip toward the root.

14. The airfoil of claim 12 wherein the outer wall has an inner surface defining at least a portion of the inner surface of the cooling passage.

15. The airfoil of claim 14 wherein the insert is non-conforming to the inner surface of the outer wall.

16. The airfoil of claim 12 wherein the cross-sectional area of the insert decreases along the flow direction.

17. The airfoil of claim 16 wherein the cross-sectional area of the insert decreases continuously.

18. The airfoil of claim 16 wherein the cross-sectional area of the insert decreases discretely.

19. An airfoil for a turbine engine, the airfoil comprising:
an outer wall bounding an interior and defining a pressure side and a suction side extending axially between a leading edge and a trailing edge to define a chord-wise direction and extending radially between a root and a tip to define a span-wise direction;
a cooling passage located in the interior and having an inner surface and defining a flow direction along the cooling passage; and
an insert provided in the cooling passage and having an imperforate sidewall terminating at an end with the imperforate sidewall spaced from the inner surface of the cooling passage by a gap; and
wherein the insert has a non-constant cross-sectional area that decreases continuously along the flow direction, the gap is non-constant along the imperforate sidewall, and at least a portion of the gap increases extending along the flow direction.

20. The airfoil of claim 19 wherein the flow direction extends in a radially inward direction from the tip toward the root.

21. The airfoil of claim 19 wherein the outer wall has an inner surface defining at least a portion of the inner surface of the cooling passage.

22. The airfoil of claim 21 wherein the insert is non-conforming to the inner surface of the outer wall.

* * * * *